United States Patent
Eschler et al.

[11] 3,802,774
[45] Apr. 9, 1974

[54] METHOD AND APPARATUS FOR DETERMINING THE THICKNESS OR WIDTH OF WORK PIECES

[75] Inventors: Hans Eschler; Ekkehard Klement, both of Muenchen; Dieter Roess, Planegg; Dieter Rosenberger, Muenchen, all of Germany

[73] Assignee: Siemens Aktiengesellschaft, Berlin and Munich, Germany

[22] Filed: Apr. 10, 1972

[21] Appl. No.: 242,362

[30] Foreign Application Priority Data
May 17, 1971 Germany.......................... 2124440

[52] U.S. Cl................... 356/4, 356/1, 250/219 LG, 250/219 WD
[51] Int. Cl............................................... G01c 3/08
[58] Field of Search.......... 356/1, 4, 5; 250/219 TH, 250/219 LG, 219 WD

[56] References Cited
UNITED STATES PATENTS

| | | |
|---|---|---|
| 3,541,337 | 11/1970 | Brandenburg............... 250/219 WD |
| 3,565,528 | 2/1971 | Witte...................... 356/5 |
| 3,536,405 | 6/1968 | Flower.......................... 250/219 TH |
| 3,565,531 | 2/1971 | Kane et al. ............... 250/219 TH X |
| 2,868,059 | 1/1959 | Summerhayes, Jr. ........ 250/219 WD |
| 3,591,293 | 7/1971 | Maltby, Jr. et al........ 250/219 TH X |
| 3,710,128 | 1/1973 | Kubisiak...................... 250/219 WD |
| 3,633,010 | 1/1972 | Svetlichny.......................... 356/1 X |

FOREIGN PATENTS OR APPLICATIONS

| | | |
|---|---|---|
| 1,056,842 | 5/1959 | Germany..................... 250/219 WD |
| 1,255,930 | 12/1967 | Germany..................... 250/219 WD |

Primary Examiner—Maynard R. Wilbur
Assistant Examiner—S. C. Buczinski
Attorney, Agent, or Firm—Hill, Sherman, Meroni, Gross & Simpson

[57] ABSTRACT

Method and apparatus for measuring the thickness, length or width of work pieces which utilizes lasers and detectors in which the beam of a laser transmitter is shifted until it is detected by the detector so as to indicate a dimension of the work piece. By utilizing laser transmitters and detectors on both sides of the member, the thickness of the member may be detected and by utilizing a laser and detector on both edges of a member the distance between the edges can be detected.

5 Claims, 6 Drawing Figures

METHOD AND APPARATUS FOR DETERMINING THE THICKNESS OR WIDTH OF WORK PIECES

BACKGROUND OF THE INVENTION

1. Field of the Invention:

This invention relates in general to a method and apparatus for measuring the thickness, length, or width of members.

2. Description of the Prior Art:

It is known in the prior art to measure the thickness of members by the utilization of X-rays or radioactive means, however, thickness measurements exceeding 100 mm. are not possible by these methods. Also, these methods require a long measuring time.

It is also known, as shown in German published application No. 1,548,361, to utilize optical methods for measuring the dimensions of work pieces in which the object being measured intercepts part of the cross section of two parallel beams of light and the remaining portions of the beams of light pass through rotating openings which allow the light to pass. The time during which the detectors receive light indicates the dimensions of the work piece. However, measurements made by this method are not very accurate and require the mechanical rotation of the openings which is a disadvantage.

German Patent No. 1,803,285 discloses an optical thickness measuring method and apparatus which is suitable for measuring the thickness of transparent foils or plates. This method transmits a beam which hits the foils or plates at an angle of 45° and which is reflected at the top and bottom of the object to be measured and the thickness of the object can be determined from the measured distances.

An additional system for measuring the width of work pieces is disclosed in German Patent No. 1,548,292 in which a self-luminous work piece or a non-luminous work piece which is illuminated at the edges transmits beams from the edges into two detectors mounted near the edges. The beams are transformed into radiation impulses by means of a rotating mirror between the edges and the detectors and the impulse shapes are due to the discontinuities of the light which occur near the edges.

The width of the work piece can be determined from the width of the impulses. This device, however, is suitable only for controlling deviations from a desired width of the work piece and the arrangement must be mounted and constructed so as to coincide with the desired width of the work piece.

SUMMARY OF THE INVENTION

This invention relates to a method and apparatus for measuring the thickness or other dimensions of a plane work piece in a fast and accurate manner and in which the work piece is not contacted. The outputs of the measurements may be provided in digital form and may be utilized with a digital computer which controls fast moving work pieces during production processes.

In one form of the present invention, laser beams are deflected step-wise relative to the ends of a work piece via acoustooptic light deflectors arranged above the work piece and detectors are mounted adjacent each end of the work piece such that reflected energy from the work piece is detected by the detectors and the length of the work piece may be determined on the basis of the time difference between the start of the deflection of the beam and the time that the detector first detects a deflected signal.

One form of the invention is utilized for measuring the thickness of a work piece wherein a light beam is directed from a laser transmitter through a deflection unit against the surface of a work piece where it is there reflected and received by a receiver thus allowing the distance from a reference plane to the surface of the work piece to be measured. On the other side of the work piece, a light beam is transmitted to the second surface of the work piece and reflected to a receiver allowing the distance from a second reference plane to the second surface to be measured. The total distance between the two reference planes is known and fixed and thus the thickness of the work piece can be determined from the two measurements made from the reference planes to the first and second surfaces of the work piece. The distance measurements are made by determining the angle at which the transmitted beam has to be deflected so as to arrive at the receiver and this angle indicates the distance to the surface of the work piece. A digital computer may be utilized to control the laser transmitters and the deflection units and receive the outputs of the receiver so as to calculate the thickness of the work piece to directly indicate the thickness to the operator.

A second apparatus and method is utilized for measuring width or length of a work piece and comprises a pair of acoustooptic light deflectors which receive laser beams and deflect them as a function of time and which reflect the beams so that they either engage or miss opposite edges of the work piece. When the beam engages the edge of the workpiece the energy is reflected into reflectors which receive energy when the light beams just intersect the edges of the work piece. The indicator receives the output of the detectors to indicate to the operators the dimension of the work piece.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
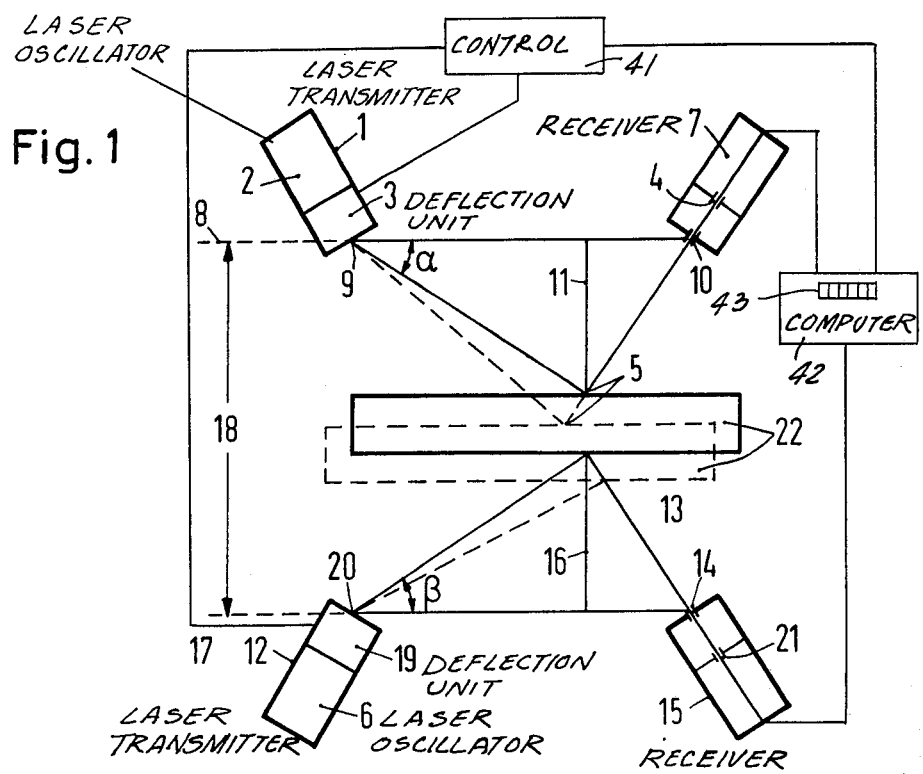
FIG. 1 is an arrangement for measuring the thickness of work pieces.

FIG. 1 illustrates apparatus for measuring the thickness of a work piece 22 which may be transported on a conveyor belt (not shown). The laser transmitter 1 comprises a laser oscillator 2 and a deflection unit 3 and transmits a beam of light in a step-wise fashion from point 9 toward the surface 5 of the work piece 22. The light receiver and detector 7 is formed with a pair of aligned openings 10 and 4 and when light energy from the transmitter 1 is received in the receiver 7, the distance from the plane 8 parallel to the surface of the work piece 22 can be determined from the angle α which the laser beam is deflected by the deflection unit 3.

A control unit 41 supplies an output to the deflection unit 3 and to a computer 42 which has an indicator 43. The deflection unit 3 changes the angle α of the light beam from the laser transmitter 1 as a function of time and the time at which the receiver 7 receives a reflected wave from the laser transmitter 1 via the surface 5 of the work piece 22 determines the height 11 of the triangle 9, 5, 10. It should be realized that the deflection unit 3 might be a crystal which may be utilized to deflect the beam by ultrasonic waves. The computer 42 receives the output of the receiver 7 and an input from the control 41 indicative of the deflection of the beam and the angle α at which an output is produced by the receiver 7 is determined and may be converted by the computer 42 into the distance 11 from the reference plane 8 to the upper surface 5 of the work piece.

On the other side of the work piece 22, a second laser transmitter 12 is mounted which comprises a laser oscillator 6 and a deflection unit 19 which also receives an input from the control 41. The laser beam from the laser transmitter 12 passes from a point 20 to the surface 13 of the workpiece 22. The beam is deflected by the deflector unit 19 as a function of time. A receiver 15 formed with a pair of openings 14 and 21. The opening 14 is mounted on a plane 17 in which the point 20 is also located. The receiver 15 provides an output to the computer 42 which can calculate the distance 16 from the plane 17 to the lower surface 13 of the work piece 22. The angle β at which energy is received by the receiver 15 determines the distance 16 from the reference plane 17 to the surface 13 of the work piece 22.

The beams from the deflection units 3 and 19 are deflected as a function of time in a step-wise manner toward the work piece and the angles α and β are known as a function of time. The angles of the deflected beams with the planes 8 and 17 respectively are known. The distance between the transmitter 1 and the receiver 7, and the distance between the transmitter 6 and the receiver 15 are also known. Thus, in both instances two angles and the included side of the triangle are known and the distances 11 and 16 can be calculated by the computer 42. Since the laser beams are deflected in a step-by-step manner over many different positions as a function of time, the particular light beam direction is associated with a time interval and by determining the time intervals at which the deflected energy is received by the receivers 7 and 15 allow a computer 42 to calculate the distances 11 and 16. In order to determine the thickness of the work piece 22, the computer 42 subtracts the sum of the distances 11 and 16 from the distance 18 between the reference planes 8 and 17. This is done electronically and the computer and the indicator 43 directly indicate the thickness of the work piece 22.

Figure 2:
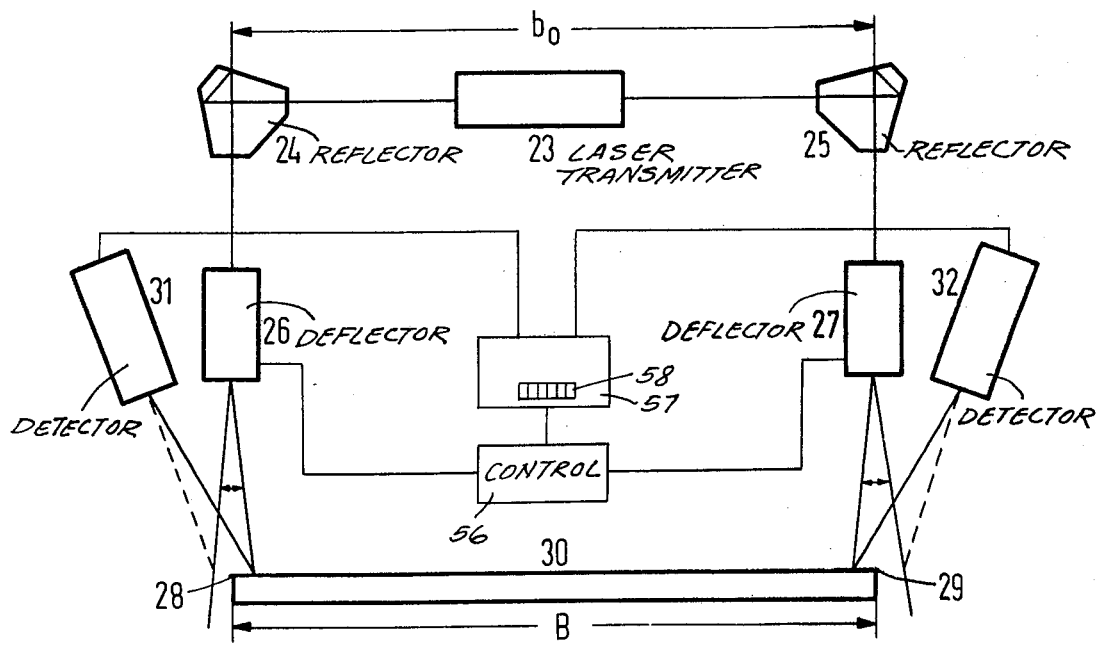
FIG. 2 is an arrangement for measuring length or width of work pieces.
Figure 3:
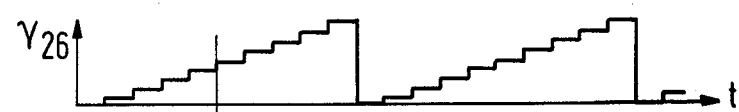
FIG. 3 is a plot of the deflection frequency versus time.
Figure 5:
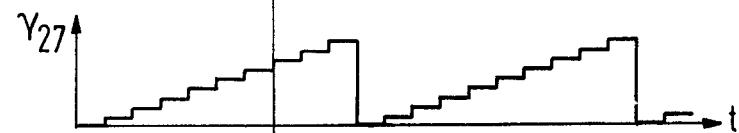
FIG. 5 is a plot of the deflection frequency versus time.

FIG. 2 illustrates apparatus for indicating the width B of a work piece 30. A laser transmitter 23 transmits laser beams from opposite ends which are intercepted by reflectors 24 and 25 and converted into parallel beams which are respectively supplied to deflector units 26 and 27. The deflector unit 26 receives an input signal from the control 56 which also supplies an input to deflector unit 27 and to a computer 57 which receives inputs from detector units 31 and 32, respectively, mounted adjacent the deflector units 26 and 27. The deflector units 26 and 27 respectively deflect the light beam in a step-wise fashion as a function of time as illustrated in FIGS. 3 and 5, respectively, under the control of the control unit 56. The width of the work piece 30 may be determined by the computer 57 in the following manner. The beam from the deflector 26 is deflected as a function of time from a position where it does not engage the work piece 30 to a position where it does engage the work piece 30. When the beam misses the end 28 of the work piece 30 energy is not reflected to the detector 31. However, when the beam first engages the end 28 of the work piece 30, light energy will be reflected to the detector 31 which will then supply an input to the computer 57. In a similar manner the beam from the deflector unit 27 will be deflected in a step-wise manner as a function of time from a position where it does not engage the end 29 of the work piece 30 until it does engage the work piece 30. The instant the energy is reflected from the end 29 of the work piece 30 into the detector 32, determines the position of the end 29 and the computer 57 can indicate on the indicator 58 the length B of the work piece 30 from the outputs of the detector units 31 and 32.

Figure 4:
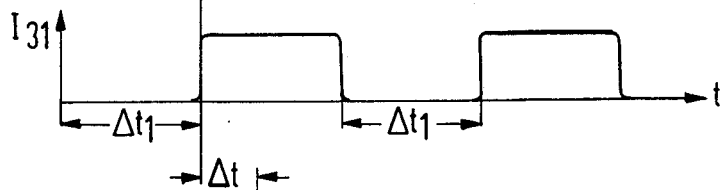
FIG. 4 is a plot of the intensity of the light signal received by detector as a function of time.

FIGS. 3 and 5 are plots of the deflection frequency of the deflection units 26 and 27 respectively as a function of time. FIG. 4 is a plot of the output of the detector unit 31 as a function of time and from 0 time to $\Delta t_1$ no signal is received by the detector unit 31 because the beam misses the end 28 of the work piece 30 and no reflected energy is received by the detector 31. At the time $\Delta t_1$ the beam engages the end 28 of the work piece 30 and the detector 31 produces an output as shown in FIG. 4.

Figure 6:
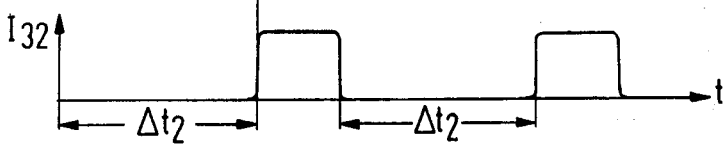
FIG. 6 is a plot of the light intensity received by the detector as a function of time.

FIG. 5 illustrates the deflection angle of the beam from the deflection unit 27 as a function of time and FIG. 6 illustrates the output of the detector unit 32 as a function of time. It is to be noted that from time 0 to $\Delta t_2$ the beam misses the end 29 of the work piece 30 and no output is produced by the detector unit 32. At the time $\Delta t_2$ the beam engages the end 29 of the work piece 30 and the detector unit 32 produces an output as shown.

Generally the light beams from the deflector units 26 and 27 will engage the ends 28 and 29 of the work piece at different times and this is indicated by the time difference $\Delta t$ between $\Delta t_1$ and $\Delta t_2$ in FIGS. 4 and 6. The distance B comprising the dimension of the work piece 30 can be determined from the formula $B = b_0 + K \cdot \Delta t$ where $b_0$ is the known distance between the deflector units 26 and 27 as illustrated in FIG. 2. The computer 57 receives the outputs from the detector units 31 and 32 as well as an input from the control 56 and calculates the dimension B and indicates it on the indicator 58 as shown.

Acoustooptic light deflectors are well known and are well suited for direct connection with digital computers and allow a digitalized output of the measured information to be obtained in a very short time. Measurements with this invention can occur in less than 1 millisecond.

Although the invention has been described with respect to preferred embodiments thereof, it is not to be so limited as changes and modifications may be made therein which are within the full intent and scope of the invention as defined by the appended claims.

We claim:

1. Apparatus for rapidly measuring the width of work pieces comprising:
   a first laser beam source for transmitting a first beam substantially normal to a transverse axis adjacent a first edge of said work piece,
   a first acousto-optical light deflector receiving said first beam and gradually deflecting it as a function of time from a position where it misses said first edge of said work piece to a position where it hits said work piece.
   a first detector mounted adjacent said first edge and receiving said first beam after it has been reflected by said first edge of said work piece,
   a second laser beam source for transmitting a second beam substantially normal to a transverse axis adjacent a second edge of said work piece,
   a second acousto-optical light deflector receiving said second beam and gradually deflecting it as a function of time from a position where it misses said edge to a position where it hits said work piece,
   a second detector mounted adjacent said second edge and a known distance from said first detection and receiving said second beam after it has been reflected by said second edge of said work piece,
   a control connected to said first and second light deflectors to gradually deflect said first and second beams as a function of time, and
   a computer receiving inputs from said first and second detectors and said control to calculate the width of said work piece.

2. Apparatus according to claim 1 wherein said first transmitting means and said first detector means are mounted adjacent a first edge of said work piece and said first means for changing the radiation angle deflects said first laser beam such that it misses and intercepts said work piece and said first detector means intercepts said first laser beam when it intercepts said work piece, said second transmitting and said second detection means are mounted adjacent a second edge of said work piece and said second means for changing the radiation angle deflects said second laser beam such that it misses and intercepts said work piece and said second detector means intercepts said second laser beam when it intercepts said work piece.

3. Apparatus according to claim 2 wherein said computer means calculates the linear dimension of said work piece from the known distance between said first and second transmitting means and the times that said first and second laser beams intercept said work piece.

4. The method for rapidly measuring the width of a work piece comprising the steps of deflecting linearly as a function of time a first laser beam from a point where it does not engage the work piece to a point where it engages a first edge of the work piece, deflecting linearly as a function of time a second laser beam in a direction opposite to said first beam from a point where it does not engage the work piece to a point where it engages a second edge of the work piece, detecting when said first beam engages said work piece, detecting when said second beam engages said work piece, and computing the width of said work piece from the times when said first and second beams engage said work piece.

5. The method according to claim 4 wherein the linear dimension of the work piece is determined from the times said two impulses are respectively produced by said two detectors when said beams first encounter the edges of said work piece edges and from the known distance between said two deflectors.

* * * * *